(12) United States Patent
Ogawa (10) Patent No.: US 7,301,588 B2
(45) Date of Patent: Nov. 27, 2007

(54) OPTICAL UNIT AND LCD DEVICE USING THE OPTICAL UNIT

(75) Inventor: Toshihisa Ogawa, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 17 days.

(21) Appl. No.: 10/376,637

(22) Filed: Mar. 3, 2003

(65) Prior Publication Data

US 2003/0164913 A1 Sep. 4, 2003

(30) Foreign Application Priority Data

Mar. 4, 2002 (JP) .............................. 2002-057275

(51) Int. Cl.
*G02F 1/1333* (2006.01)
(52) U.S. Cl. .......................................... 349/58; 349/62
(58) Field of Classification Search .................. 349/58, 349/67, 113; 361/60; 362/31
See application file for complete search history.

(56) References Cited

U.S. PATENT DOCUMENTS

| | | | | |
|---|---|---|---|---|
| 4,789,224 A | * | 12/1988 | Bougsty | ....................... 349/65 |
| 5,886,759 A | * | 3/1999 | Mashino et al. | ............... 349/65 |
| 6,046,785 A | * | 4/2000 | Won | ............................. 349/58 |
| 6,064,455 A | | 5/2000 | Kim | |
| 6,147,724 A | | 11/2000 | Yoshii et al. | |
| 6,392,724 B2 | * | 5/2002 | An et al. | ....................... 349/58 |
| 6,626,550 B2 | * | 9/2003 | Choi | ............................ 362/31 |

FOREIGN PATENT DOCUMENTS

| | | |
|---|---|---|
| JP | 2-138727 | 11/1990 |
| JP | 6-130387 A | 5/1994 |
| JP | 06-242731 | 9/1994 |
| JP | 09-265011 | 10/1997 |
| JP | 09-282919 | 10/1997 |
| JP | 10-068826 | 3/1998 |
| JP | 11-305228 | 11/1999 |
| JP | 2001-091945 | 4/2001 |
| KR | A 2003-0008790 | 1/2003 |

* cited by examiner

*Primary Examiner*—David Nelms
*Assistant Examiner*—Richard H Kim
(74) *Attorney, Agent, or Firm*—McGinn IP Law Group PLLC

(57) ABSTRACT

An optical unit comprises a frame. A light conductive plate is combined with the frame only and stationary relative thereto.

20 Claims, 6 Drawing Sheets

OPTICAL UNIT AND LCD DEVICE USING THE OPTICAL UNIT

BACKGROUND OF THE INVENTION

1. Field of the Invention

The present invention relates to an optical unit for use in a liquid crystal display (LCD) device, and to a LCD device incorporating such optical unit.

2. Description of the Related Art

In the field concerning miniaturized LCD devices, use of an optical unit as a built-in backlight has widely spread. Commonly, such optical unit includes a light conductive plate and a source of light, for example, a fluorescent tube or LED. The incident light from the source of light impinges upon the adjacent edge of the light conductive plate. The light diffuses within the light conductive plate. The diffused light illuminates the associated LCD through a planar surface of the light conductive plate. A light reflective sheet covers at least a portion of the light conductive plate to reflect the diffused light back inwardly. This so-called edge type system is advantageous in thinness.

Figure 11:
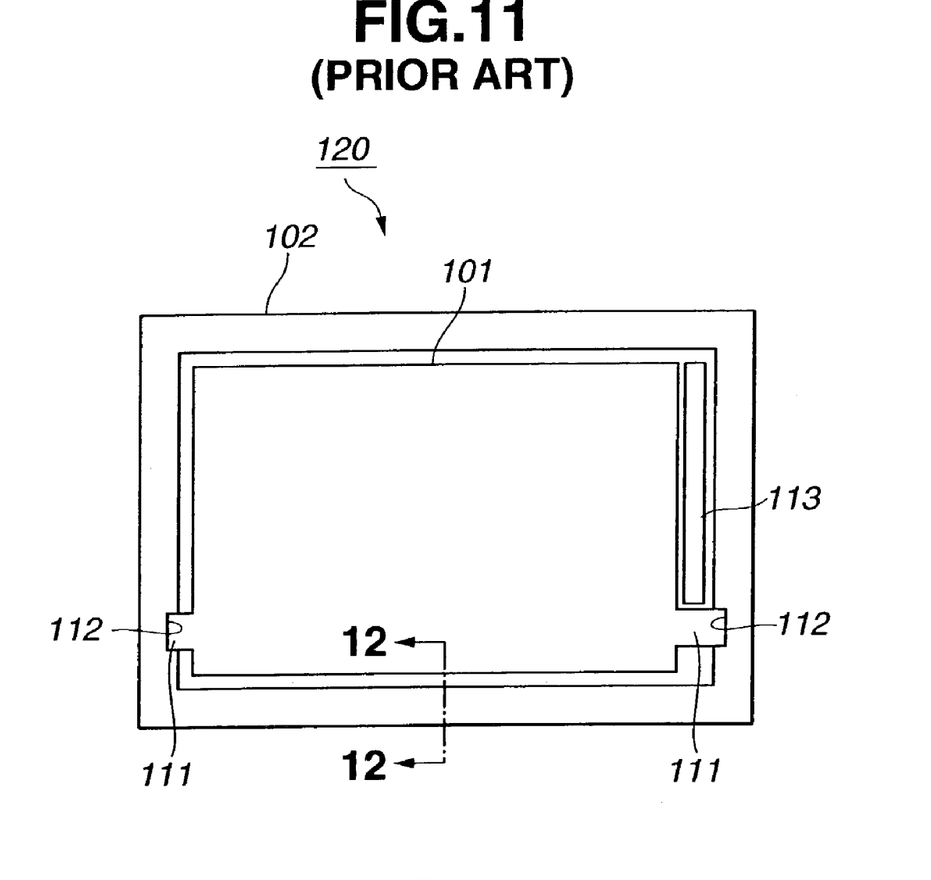
FIG. 11 is a plan view, similar to FIG. 1, of the before discussed optical unit according to the prior art.
Figure 12:
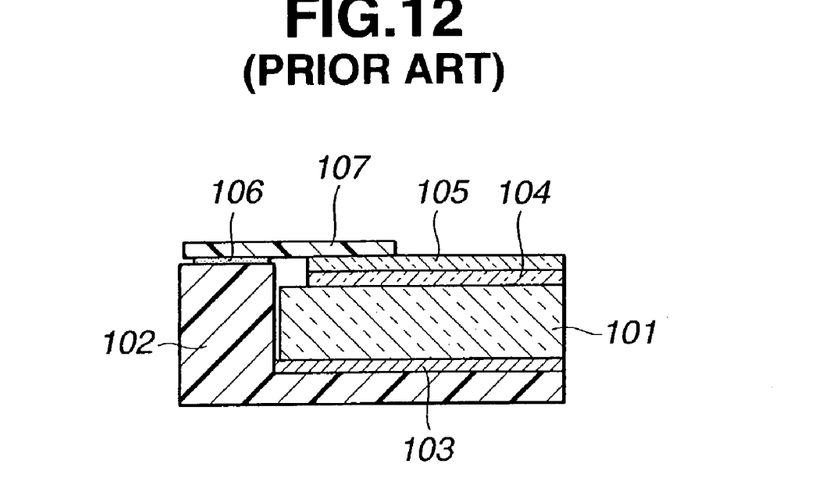
FIG. 12 is a cross section taken through the line 12-12 in FIG. 11.

One example of the edge type system is illustrated in FIGS. 11 and 12. FIG. 11 is a plan view of an optical unit 120 according to the prior art with unnecessary sheets removed to illustrate a frame 102. FIG. 12 is a cross section taken through the line 12-12 in FIG. 11. The frame 102 is a rectangular receptacle with a shallow rectangular space. The frame 102 includes four-sided inner peripheral wall and an end wall, which are interconnected to define the shallow rectangular space. As best seen in FIG. 12, the frame 102 receives within the shallow rectangular space a reflective sheet 103 covering the end wall, a light conductive plate 101, and a LED 113. The frame 102 has two positioning grooves 112, with which the opposed sides of the inner peripheral wall are formed, respectively. The light conductive plate 101 has two positioning projections 111 inserted into the positioning grooves 112, respectively. The two projections 111 extend outwardly from sides of the light conductive plate 101. The light conductive plate 101 has a surface covered with a lens sheet 104 and a diffusion sheet 105. The lens sheet 104 extends over almost the entire area of the surface of the light conductive plate 101. The diffusion sheet 105 covers the entire area of the surface of the lens sheet 104. An antiglare sheet 107, which is formed with a rectangular opening, is fast on the frame 102 by adhesive 106 in a manner to cross the boundary between the inner peripheral wall of the frame 102 and the light conductive plate 101 (see FIG. 12).

The market for mobile terminals is growing bigger and bigger. Personal digital assistants (PDA) and mobile telephones constitute the market. In the market, there is strong demand for a reduction in thickness, weight and cost of LCD devices for beneficial application to the PDA and mobile telephones. Accordingly, a need remains for a thin, light and inexpensive optical unit.

The illustrated known optical unit 120 does not meet this need to a satisfactory level. In this known unit, the end wall of the frame 102 plays an important role in retaining an appropriate relationship between the light conductive plate 101 and light reflective plate 103.

With regard to the relationship between a light conductive plate and a frame, JP-A 11-305228 proposes interposing a light conductive plate between a frame and a light reflective sheet and adhering the light reflective plate to the frame. Without the light reflective plate, the light conductive plate would drop out of the frame because it is not held stationary relative to the frame. The light conductive plate is fast on the frame by adhesive only. Thus, there is a potential problem that the appropriate positional relationship between the light conductive plate and the frame may not hold if the light conductive plate is stressed against the light reflective sheet.

SUMMARY OF THE INVENTION

An object of the present invention is to provide a thin optical unit, in which a light conductive plate is reliably held in an appropriate positional relationship with the associated element(s).

Another object of the present invention is to provide a LCD device incorporating an optical unit of the above kind.

According to one exemplary implementation of the invention, there is provided an optical unit comprising:

a frame; and a light conductive plate combined with only the frame to be stationary relative thereto.

According to another exemplary implementation of the present invention, there is provided an optical unit for a liquid crystal display device, comprising:

a light conductive plate;

a source of light arranged to impinge light onto an edge of the light conductive plate; and a retainer, including a light reflective sheet portion, for keeping the light conductive plate, the source of light and the light reflective sheet portion in an appropriate positional relationship.

BRIEF DESCRIPTION OF THE DRAWINGS

The present invention will be apparent from the following more particular description of exemplary embodiments of the invention as illustrated in the accompanying drawings. The drawings are not necessarily to scale, emphasis instead being placed upon illustrating the principles of the invention.

DESCRIPTION OF THE EXEMPLARY EMBODIMENTS

Referring to the accompanying drawings, like reference numerals are used to designate like parts or portions throughout each view of FIGS. 1 to 10 for the sake of brevity of description.

Figure 1:
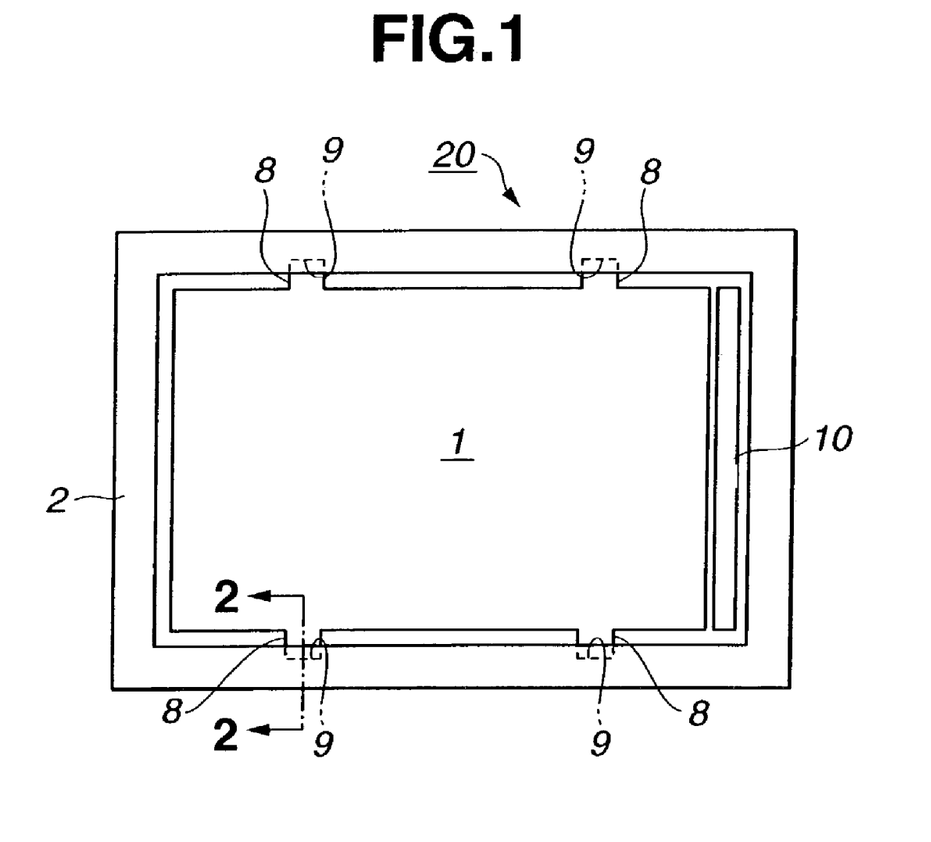
FIG. 1 is a plan view of one exemplary implementation of an optical unit according to the present invention, with unnecessary elements removed to illustrate a frame and a light conductive plate combined with only the frame to be stationary relative thereto.
Figure 2:
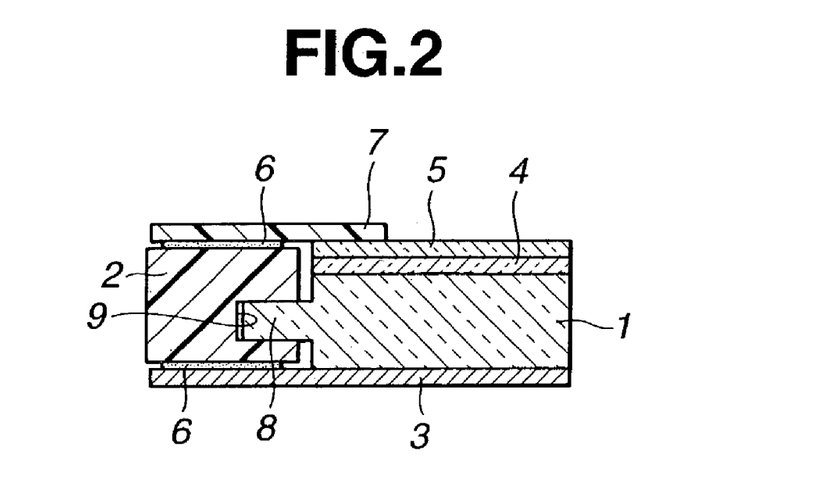
FIG. 2 is a cross section taken through the line 2-2 in FIG. 1.

FIGS. 1 and 2 illustrate one exemplary implementation an optical unit 20 of the present invention. The optical unit 20 includes a light conductive plate 1 and a frame 2. The light conductive plate 1 is rectangular and has four sides. Molding has formed the frame 2. The frame 2 has a rectangular opening and includes a four-sided inner peripheral wall defining the rectangular opening.

The light conductive plate 1 is combined with the frame 2 only to be stationary relative to it. In the illustrated optical unit 20, the light conductive plate 1 is held stationary, within the rectangular opening, relative to the frame 2. The light conductive plate 1 has four fixing projections 8, which are inserted into and received by four fixing hollows 9, respectively. The frame 2 is formed with the hollows 9. The four fixing hollows 9 are located in two opposed sides of the inner peripheral wall of the frame 2, two in one of the two opposed sides, the other two in the other side. The four fixing projections 8 are located in two opposite sides of the light conductive plate 1, two in one of the two opposite sides, the other two in the other side. With the fixing hollows 9 receiving the fixing projections 8, the frame 2 retains the light conductive plate 1. As can readily be seen from FIGS. 1 and 2, with fixing projections 8 within fixing hollows 9, removal of light conductive plate 1 from frame 2 requires relative movement between the frame 2 and the light conductive plate 1 in a direction other than normal to the plane defined by light conductive plate 1, as well as movement of the light conductive plate in a direction having a component normal to the plane.

On one of the four sides, the light conductive plate 1 has a light receiving edge positioned near a translucent tube 10. The light conductive plate 1 has a front surface and a rear surface. A light reflective sheet 3 covers the entire area of the rear surface of the light conductive plate 1. At a portion near the periphery, the light reflective sheet 3 is fast on one end surface of the frame 2 by adhesive 6, for example, a pressure sensitive adhesive double-coated tape. Optical sheets cover the front surface of the light conductive plate. In the illustrated optical unit 20, a lens sheet 4 covers the entire area of the front surface of the light conductive plate 1, and a diffusion sheet 5 covers the entire area of the surface of the lens sheet 4. An antiglare sheet 7, which is formed with a rectangular opening defining a light discharge region, is fast on the opposite end surface of the frame 2 by adhesive 6 in a manner to cross the boundary between the inner peripheral wall of the frame 2 and the light conductive plate 1. The antiglare sheet 7 keeps the diffusion sheet 5 and lens sheet 4 in appropriate position on the surface of the light conductive plate 1.

From the preceding description on the optical unit 20, it is appreciated that the frame 2 does not require a bottom end wall and retains the light conductive plate 1 by holding the sides of it. Employing the frame 2 without the bottom end wall makes a great contribution to a reduction in thickness of the optical unit 20. A reduction in thickness as much as 20% has resulted in a comparison of the optical unit 20 with the known optical unit 120.

In addition to coupling between the light conductive plate 1 and the frame 2, the antiglare sheet 7 and the light reflective sheet 3 interpose therebetween the light conductive plate 1 to hold the light conductive plate 1 firmly within the frame 2. This causes an increase in stiffness of the optical unit 20. In other words, the frame 2, light reflective sheet 3 and antiglare sheet 7 cooperate with each other to form a retainer, which can keep the light conductive plate 1 and the associated optical sheets 4 and 5 in the appropriate positional relationship even under external stress. This brings about a reduction in damage to the light conductive plate 1, enhancing reliability of the optical unit 20.

The number of fixing projections 8 and hollows 9 is not limited to four (4). The number may be any appropriate even number that is determined after due consideration of design requirements on the relationship between the light conductive plate 1 and frame 2. For example, the number may be two (2) or six (6).

In the optical unit 20, the light conductive plate 1 has the fixing projections 8, and the frame 2 has the fixing hollows 9. The present invention is not limited to this example. The fixing projections may project from the frame, and the fixing hollows may be in the light conductive plate.

Figure 3:
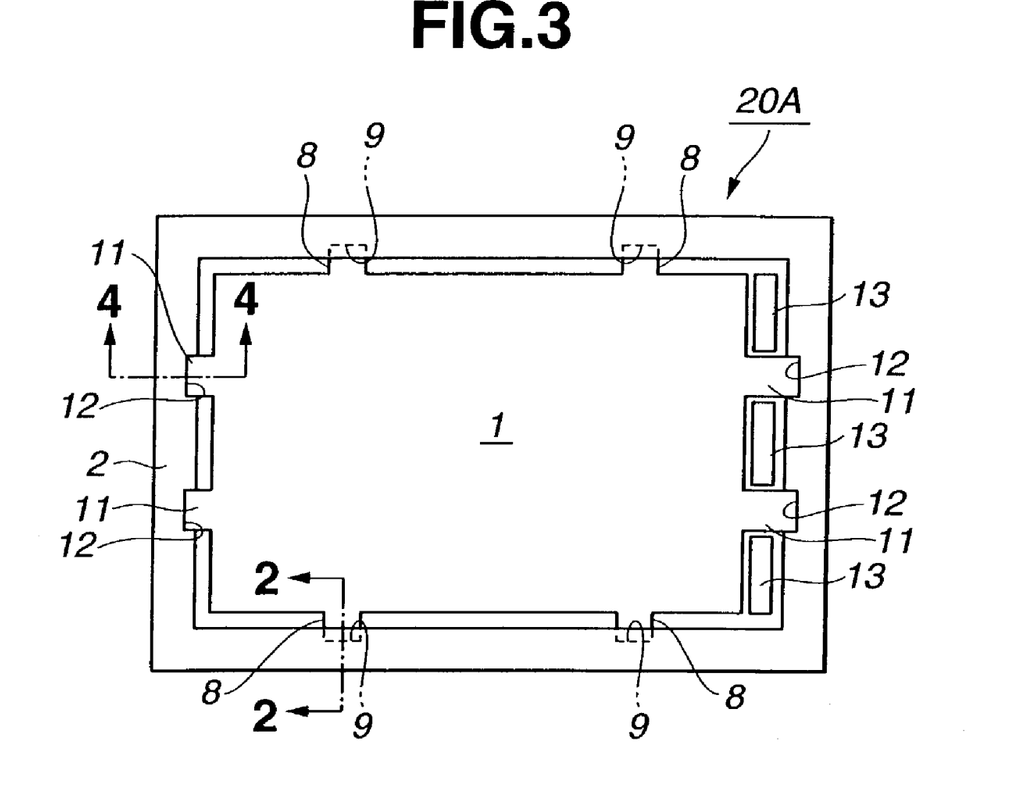
FIG. 3 is a similar to FIG. 1, illustrating a modification of the exemplary implementation.
Figure 4:
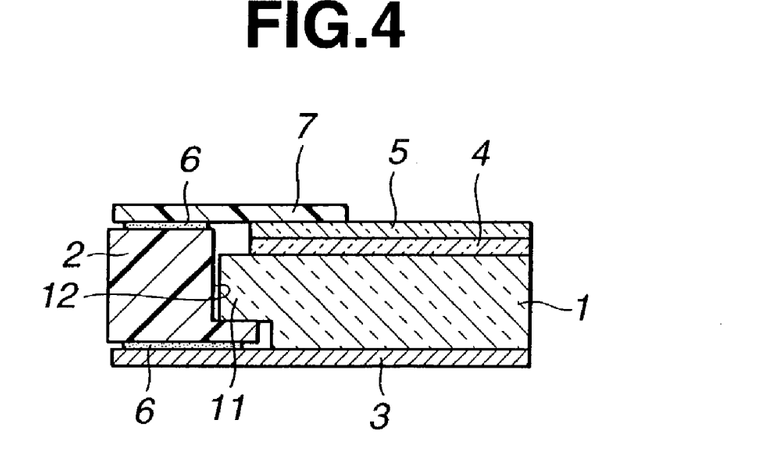
FIG. 4 is a cross section taken through the line 4-4 in FIG. 3.

FIGS. 3 and 4 illustrate a modification. A modified optical unit is generally indicated at 20A. The optical unit 20A is substantially the same as the previously described optical unit 20. However, the optical unit 20A is different from the optical unit 20 in the provision of positioning projections 11 and positioning grooves 12. A frame 2 has four positioning grooves 12, two on one of two opposed sides of the inner peripheral wall, the other two on the other side. These two opposed sides are free from the fixing hollows 9. A light conductive plate 1 has four positioning projections 11 inserted into and received by the positioning grooves 12, respectively. The two of the four positioning projections 11 extend outwardly from one of two opposite sides, and the other two positioning projections 11 from the other side. These opposite sides are free from the fixing projections 8. Another difference resides in the use of LED 13 as a source of light instead of the fluorescent tube 10.

In the modified optical unit 20A, the positioning work of the light conductive plate 1 becomes easy due to the provision of the positioning projections 11 and grooves 12.

Figure 5:
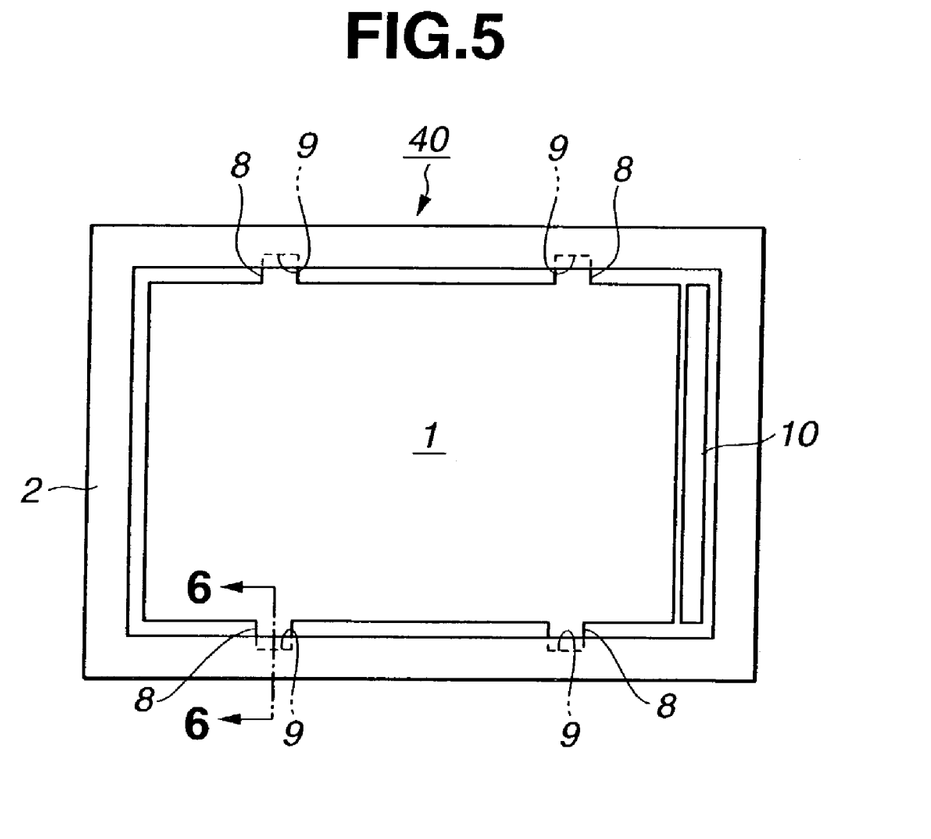
FIG. 5 is a plan view of another exemplary implementation of an optical unit according to the present invention, with unnecessary elements removed to illustrate a frame and a light conductive plate combined with only the frame to be stationary relative thereto.
Figure 6:
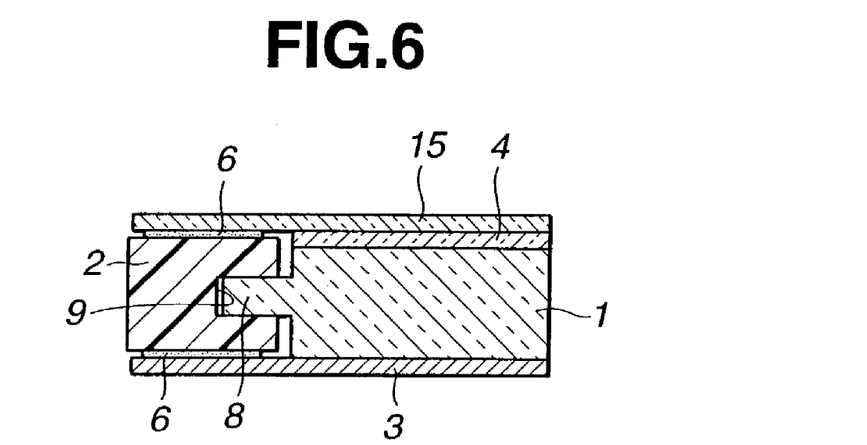
FIG. 6 is a cross section taken through the line 6-6 in FIG. 5.
Figure 7:
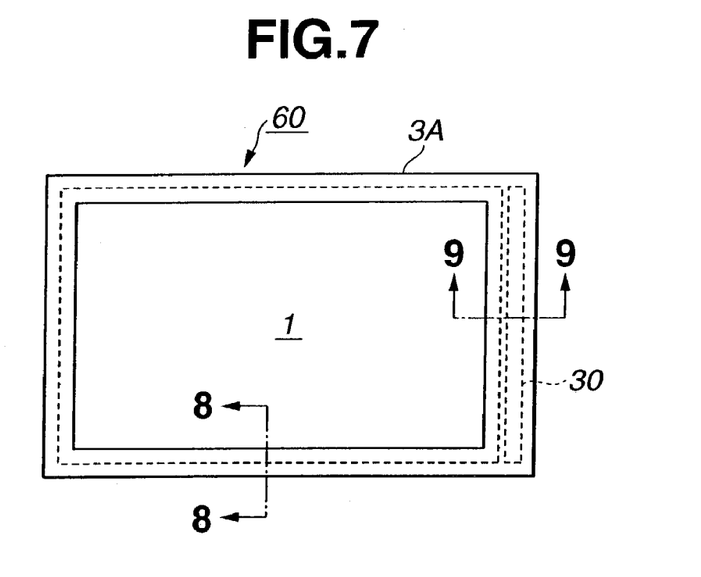
FIG. 7 is a plan view of another exemplary implementation of an optical unit according to the present invention.

FIGS. 5 and 6 illustrate another exemplary implementation of an optical unit 40 according to the present invention. The optical unit 40 is substantially the same as the optical unit 20. However, the optical unit 40 is different from the optical unit 20 in that the antiglare sheet 7 has been eliminated. The optical unit 40 has eliminated the antiglare sheet 7 by using a slightly enlarged diffusion sheet 15. As best seen in FIG. 6, the diffusion sheet 15 covers also the end surface of a frame 2. At an area portion immediately inward of the periphery, the diffusion sheet 15 is fast on the end surface of the frame 2 by adhesive 6.

Elimination of the antiglare sheet 7 has provided a further reduction in thickness in the optical unit 40 as compared to the previously discussed optical unit 20.

FIGS. 7 to 10 illustrate another exemplary implementation of an optical unit 60 according to the present invention.

Before entering the description on the optical unit 60, it is to be remembered that, in the optical unit 20 illustrated in FIGS. 1 and 2, the frame 2, light reflective sheet 3 and antiglare sheet 7 cooperate with each other to form a retainer, which can keep the light conductive plate 1 and the associated optical sheets 4 and 5 in the appropriate positional relationship.

The optical unit 60 is substantially the same as the optical unit 20 in that the retainer keeps the light conductive plate 1 and the associated optical sheets 4 and 5 in the appropriate positional relationship. However, as different from the optical unit 20, a retainer 3A of the optical unit 60 is a single piece made of a light reflective sheet. Accordingly, the optical unit 60 does not use the frame 2 and the antiglare sheet 7, which are used in the optical unit 20 as constituent elements of the retainer.

Figure 9:
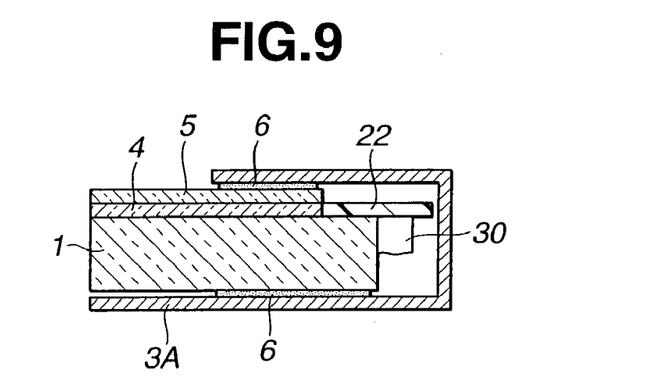
FIG. 9 is a cross section taken through the line 9-9 in FIG. 7.
Figure 10:
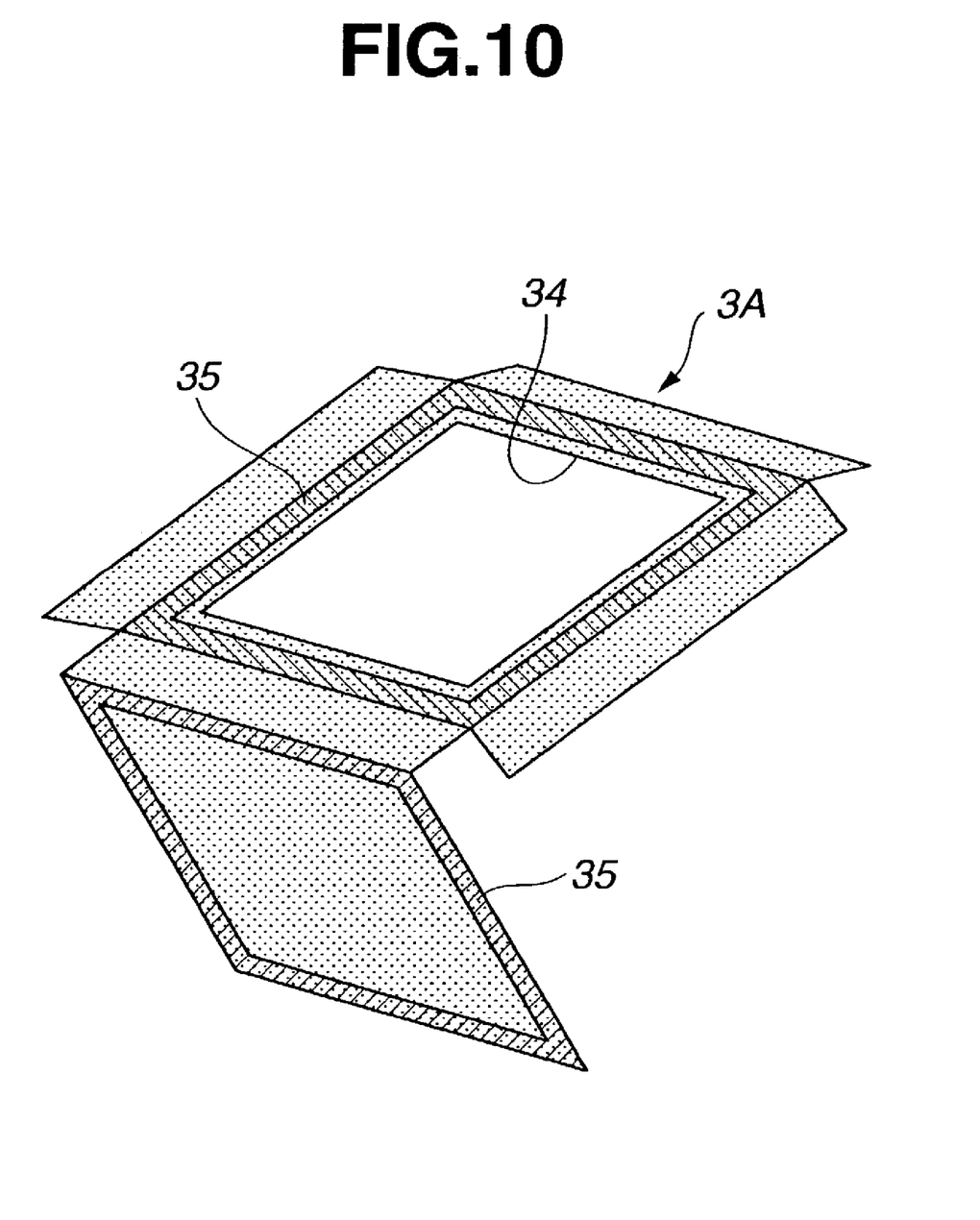
FIG. 10 is an unfolded view of a retainer including a light reflective portion.

With reference to FIG. 10, the illustrated shadowed areas 35 indicate a first area portion where the retainer 3A is fast on the rear surface of the light conductive plate 1 (see FIGS. 8 and 9) by adhesive 6 and a second area portion where the retainer 3A is fast on the surface of the diffusion sheet 5 on the lens sheet 4. The retainer 3A includes an integral rectangular light reflective sheet portion surrounded by the above-mentioned one area portion 35. This rectangular light reflective sheet portion covers the rear surface of the light conductive plate 1 when the retainer 3A is folded and fastened on the light conductive plate 1 and the diffusion sheet 5. The retainer 3A is formed with a rectangular opening 34 that is surrounded by the above-mentioned second area portion. This rectangular opening 34 defines a light discharge region on the diffusion sheet 5 over the front surface of the light conductive plate 1.

The following explanation of the manner of assembly may help the reader to understand the advantageous features of the optical unit 60.

First, attach a fluorescent tube 30 via flexible cable 22 (FIG. 9) to the light conductive plate 1 near the light receiving edge.

Second, lay the lens sheet 4 over the front surface of the light conductive plate 1.

Third, lay the diffusion sheet 5 over the surface of the lens sheet 4.

Fourth, with the rectangular light reflective sheet portion laid over the rear surface of the light conductive plate 1, fold the retainer 3A in a manner to wrap the light conductive plate 1, fluorescent tube 30 and diffusion sheet 5.

Figure 8:
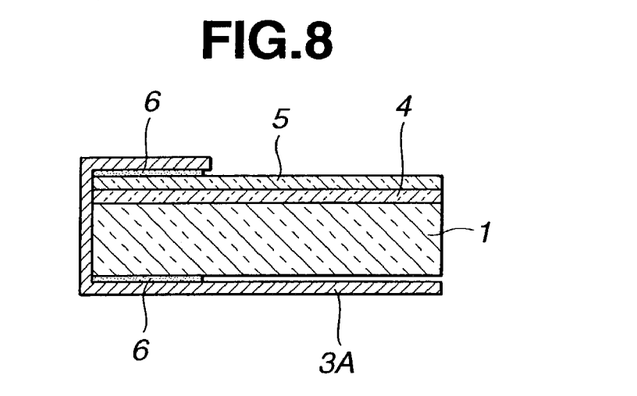
FIG. 8 is a cross section taken through the line 8-8 in FIG. 7.

Fifth, press the retainer 3A along the area portions 35 to fasten it on the rear surface of the light conductive plate 1 and on the diffusion sheet 5 via adhesive 6 as shown in FIGS. 8 and 9.

From the preceding description, it is appreciated that the optical unit 60 is advantageous over the optical unit 20 in a reduction of the number of constituent components because the frame 2 is no longer needed.

The optical units 20, 20A, 40 and 60 can be incorporated as a backlight in the usual manner as a component of LCD devices to illuminate the LCD.

In one embodiment, a liquid crystal display device comprises a liquid crystal, a pair of substrates having interposed therebetween the liquid crystal, and an optical unit 20 or 20A or 40 or 60 arranged on one side of one of the pair of substrates.

While the present invention has been particularly described, in conjunction with exemplary implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2002-057275, filed Mar. 4, 2002, the disclosure of which is hereby incorporated by reference in its entirety.

What is claimed is:

1. An optical unit, comprising:
a frame formed to define an opening; and
a light conductive plate having opposed planar surfaces and sides retained within the opening, the frame holding the sides of the light conductive plate to be stationary relative to the frame,
wherein removal of said light conductive plate from said frame requires:
relative movement between said frame and said light conductive plate in a direction other than normal to a plane defined by said light conductive plate; and
relative movement between said frame and said light conductive plate in a direction having a component normal to said plane.

2. The optical unit as claimed in claim 1, wherein one of the frame and the light conductive plate comprises fixing hollows, and the opposite one of the frame and the light conductive plate comprises fixing projections inserted into the fixing hollows, to affix the light conductive plate to the frame.

3. The optical unit as claimed in claim 2, wherein the frame has an inner peripheral wall defining the opening, and wherein the fixing hollows or the fixing projections are formed from the opposed sides of the inner peripheral wall.

4. The optical unit as claimed in claim 2, wherein the frame is a monolithic molded frame and the fixing hollows or fixing projections are molded into the frame.

5. The optical unit as claimed in claim 1, further comprising an antiglare sheet fastened on a first end surface of the frame and across a boundary between the frame and a first surface of the light conductive plate.

6. The optical unit as claimed in claim 5, further comprising a light reflective sheet fastened on a second end surface of the frame and covering at least a portion of a surface of the frame and a second surface of the light conductive plate.

7. The optical unit as claimed in claim 1, further comprising a diffusion sheet fastened on a first end surface of the frame and covering at least a portion of a surface of the frame and a first surface of the light conductive plate.

8. The optical unit as claimed in claim 7, further comprising a light reflective sheet fastened on a second end surface of the frame and covering at least a portion of a surface of the frame and a second surface of the light conductive plate.

9. The optical unit as claimed in claim 1, wherein the frame is a molded frame formed as a single unit.

10. The optical unit as claimed in claim 1, wherein the opening is four-sided and is defined by an inner peripheral wall of the frame.

11. The optical unit as claimed in claim 10, wherein the opening is rectangular.

12. An optical unit, comprising:
a frame formed to define an opening; and
a light conductive plate having opposed planar surfaces and sides retained within the opening by the frame holding the sides of the light conductive plate to be stationary relative the frame, said frame and said light conductive plate being arranged and configured such that removal of said light conductive plate from said frame requires:
relative movement of said frame with respect to said light conductive plate in a direction other than normal to a plane defined by said light conductive plate, followed by movement of said light conductive plate relative to said frame in a direction having a component normal to said plane.

13. The optical unit as claimed in claim 12, wherein the light conductive plate and the frame comprise projections that couple into hollows, and are arranged such that the relative movement of said frame with respect to said light conductive plate in the direction other than normal to the plane defined by said light conductive plate uncouples the projections from the hollows.

14. The optical unit as claimed in claim 12, wherein one of the frame and the light conductive plates has fixing hollows, and the opposite one of the frame and the light conductive plate has fixing projections inserted into the fixing hollows to affix the light conductive plate to the frame.

15. The optical unit as claimed in claim 14, wherein the frame has an inner peripheral wall defining the opening, and wherein the fixing hollows or the fixing projections are formed in opposed sides of the inner peripheral wall.

16. The optical unit as claimed in claim 12, further comprising an antiglare sheet fastened on a first end surface of the frame and across a boundary between the frame and a first surface of the light conductive plate.

17. The optical unit as claimed in claim 16, further comprising a light reflective sheet fastened on a second end surface of the frame and covering at least a portion of a surface of the frame and a second surface of the light conductive plate.

18. The optical unit as claimed in claim 12, wherein the frame is a molded frame formed as a single item.

19. The optical unit as claimed in claim 18, wherein the frame is a molded frame and the fixing hollows or fixing projections are molded into the frame.

20. The optical unit as claimed in claim 12, wherein the opening is defined by a rectangular peripheral edge.

* * * * *